United States Patent
Hu

(10) Patent No.: US 8,411,622 B2
(45) Date of Patent: Apr. 2, 2013

(54) MULTI-CHANNEL INTER BASE-STATION COMMUNICATION

(75) Inventor: Wendong Hu, San Jose, CA (US)

(73) Assignee: STMicroelectronics, Inc., Coppell, TX (US)

(*) Notice: Subject to any disclaimer, the term of this patent is extended or adjusted under 35 U.S.C. 154(b) by 1230 days.

(21) Appl. No.: 12/118,555

(22) Filed: May 9, 2008

(65) Prior Publication Data

US 2008/0279165 A1 Nov. 13, 2008

Related U.S. Application Data

(60) Provisional application No. 60/917,533, filed on May 11, 2007, provisional application No. 60/917,841, filed on May 14, 2007.

(51) Int. Cl.
*H04W 72/00* (2009.01)
*H04W 72/04* (2009.01)
*H04W 74/04* (2009.01)
*H04W 28/26* (2009.01)

(52) U.S. Cl. ........ 370/329; 370/339; 370/338; 370/348; 370/350; 455/443; 455/450

(58) Field of Classification Search .................. 370/337, 370/338, 321, 322, 324, 326, 328, 329, 345, 370/347, 348, 350; 455/422.1, 443, 450, 455/451, 452.1
See application file for complete search history.

(56) References Cited

U.S. PATENT DOCUMENTS

| 7,756,058 | B2 | 7/2010 | Cordeiro et al. | |
|---|---|---|---|---|
| 7,826,422 | B2 | 11/2010 | Chu et al. | |
| 8,023,956 | B2* | 9/2011 | Hu | 455/452.1 |
| 8,031,681 | B2 | 10/2011 | Chu et al. | |
| 8,045,993 | B2* | 10/2011 | Chu et al. | 455/452.2 |
| 8,175,046 | B2 | 5/2012 | Cordeiro et al. | |
| 8,199,707 | B2* | 6/2012 | Hu | 370/329 |
| 8,233,444 | B2 | 7/2012 | Cordeiro et al. | |
| 8,285,297 | B2* | 10/2012 | Chu et al. | 455/452.2 |
| 2007/0223419 | A1* | 9/2007 | Ji et al. | 370/329 |
| 2007/0280163 | A1* | 12/2007 | Zhang | 370/331 |
| 2008/0159258 | A1* | 7/2008 | Ji et al. | 370/350 |
| 2008/0253341 | A1* | 10/2008 | Cordeiro et al. | 370/338 |

FOREIGN PATENT DOCUMENTS

WO 2007031960 A2 3/2007

OTHER PUBLICATIONS

Cordeiro et al, Cognitive PHY and MAC Layers for Dynamic Spectrum Access and Sharing of TV Bands, Aug. 5, 2006, ACM, 11 pages.*
IEEE P802.22™/DO.1 Draft Standard for Wireless Regional Area Networks Part 22: Cognitive Wireless RAN Medium Access Control (MAC) and Physical Layer (PHY) specifications: Policies and procedures for operation in the TV Bands, IEEE 802.22 Working Group of the LAN/MAN Standards Committee, IEEE P802.22/DO.1, May 2006, pp. i-v,1-299.

* cited by examiner

*Primary Examiner* — Chi Pham
*Assistant Examiner* — Ahmed Elallam
(74) *Attorney, Agent, or Firm* — Hogan Lovells US LLP

(57) ABSTRACT

The invention relates to systems and methods for spectrum sharing and communication among several wireless communication networks with overlapping service areas (or cells); especially to Wireless Regional Area Networks (WRANs). Particular embodiments of the invention disclose using a conference channel to communicate between base stations. Other embodiments use slotted coexistence windows within frames to transmit and receive information, including for reserving transmission times within subsequent frames.

18 Claims, 11 Drawing Sheets

MULTI-CHANNEL INTER BASE-STATION COMMUNICATION

This application claims the benefit of U.S. Provisional Patent Application Nos. 60/917,533, filed on May 11, 2007 and 60/917,841, filed on May 14, 2007, both applications are hereby incorporated by reference for all purposes as if fully set forth herein.

BACKGROUND OF THE INVENTION

1. Field of the Invention

The invention relates generally to communication systems and in particular to radio frequency (RF) architectures.

2. Discussion of the Related Art

The Institute of Electrical and Electronics Engineers (IEEE) formed the IEEE 802.22 Working Group to develop protocols for an interoperable air interface for use in spectrums allocated to TV broadcast service and to provide wireless services, such as broadband access, a point-to-multipoint wireless regional area network (WRAN). IEEE 802.22 specifies that a network should operate in a point-to-multipoint (P2MP) basis. A system should be formed by base stations (BSs) and customer premise equipment (CPE). The CPEs are attached to the BSs via wireless links in a specified frequency range. Each BS controls the medium access for all CPEs attached to it.

Currently, co-channel inter-BS communication using co-existence beaconing protocol (CBP) is the state of the art. FIG. 1 is directed towards a related art communication between BSs of multiple neighboring WRAN cells that are operating on the same channel. Referring to FIG. 1, the system is illustrated generally as reference number 100. As shown in FIG. 1, a WRAN1 102 and WRAN2 104 are operating on the same channel. There are multiple frames n to n+3 in which data from WRAN1 102 and data from WRAN2 104 can be transmitted. At the end of every data frame, WRAN1 102 and WRAN2 104 schedule a contention-based (i.e. carrier sense media access (CSMA) protocol based) co-existence window (CW) 110 in which co-existence beacon (CB) packets 112 can be transmitted and received. In operation, WRAN1 102 and WRAN2 104 need to co-exist with each in order to avoid operating on the same channel as neighbors and licensing incumbents.

When data frames of WRAN cells are synchronized on all operating channels as shown in FIG. 1 and the CWs 110 are synchronized among WRAN1 102 and WRAN2 104, the WRAN cells can transmit or receive CB packets 112 during the synchronized CWs 110 using best effort, contention-based protocols so as to communicate with one another. Best effort, contention-based protocols are known to one of ordinary skill in the art and include, for example, those described in IEEE 802.22 Draft Standard version 0.1, document number 22-06-0068-00-0000, which is incorporated by reference. In operation, WRAN1 102 and WRAN2 104 can communicate with each other over the CWs 110 at the end of each frame as all the frames are synchronized. More specifically, if WRAN1 102 is transmitting and WRAN2 104 is receiving, communication would be successful.

However, there is also a need to communicate among neighboring WRAN cells that are operating on different channels for exchanging co-existence information. The need to communicate among neighboring cells includes, for example, communicating for sensing quiet period coordination and spectrum sharing coordination, among other needs. FIG. 2 illustrates a related art communication between BSs of multiple neighboring WRAN cells that are operating on different channels. Referring to FIG. 2, the system is illustrated generally as reference number 200. The system 200 includes a WRAN1 202 and WRAN2 204 operating on different channels as identified by the hatching and non-hatching patterns.

The system is similar to the single-channel CBP operation of FIG. 1 in that there are multiple frames n to n+3 in which data from WRAN1 202 and data from WRAN2 204 can be transmitted to each other. This communication occurs as each WRAN cell (202 and 204) schedules a CW 210 at the end of every data frame in which CB packets 212 can be transmitted and received. More specifically, in communication of WRAN1 202 and WRAN2 204 during a CW 210, each WRAN cell can either stay on its own operating channel or tune to another channel occupied by a neighboring WRAN cell. For example, WRAN1 202 can tune to either channel 214 illustrated by a non-hatching pattern or channel 216 illustrated by a cross-hatching pattern during a CW 210.

It is apparent from FIG. 2 that the communications between two neighboring WRAN cells can succeed only when these two cells are tuned to the same channel during a CW 210. In addition, communication will only succeed when one of the WRAN cells is transmitting and the other is receiving. This is illustrated as CB packets 212 are exchanged when the CW 210 of neighboring WRAN1 202 and WRAN2 204 are on the same communication channel 216. There is a problem with multi-channel inter-WRAN communication when the cells are on different channels or when the transmitting and receiving of the WRAN cells are not coordinated, that is, no communication is received as indicated by reference 218. This leads to poor efficiency of co-existence communications among multiple neighboring WRAN cells that operate on different channels. Accordingly, coordination of CB communications ensures the success of multi-channel inter-WRAN communication using CBP.

SUMMARY OF THE INVENTION

Accordingly, the present invention is directed to multi-channel inter base-station communication that substantially obviates one or more of the problems due to limitations and disadvantages of the related art.

An advantage of the invention is to provide enhanced efficiency of co-existence communications among multiple neighboring WRAN cells that operate on different channels.

Additional features and advantages of the invention will be set forth in the description which follows, and in part will be apparent from the description, or may be learned by practice of the invention. The features of the invention will be realized and attained by the structure particularly pointed out in the written description and claims hereof as well as the appended drawings.

To achieve these and other advantages and in accordance with the purpose of the invention, as embodied and broadly described, an embodiment of the invention includes a multi-channel inter-BS communication system and a plurality of co-existing WRAN cells. Each of the plurality of co-existing WRAN cells includes a plurality of data frames, and at the end of each of the plurality of data frames is a slotted CW.

In another aspect, an embodiment of the invention includes a CW reservation protocol for a WRAN. The CW reservation protocol includes a plurality of co-existing WRAN cells. Each of the plurality of co-existing WRAN cells includes a plurality of data frames, and at the end of each of the plurality of data frames is a slotted CW.

In yet another aspect, an embodiment of the invention includes a multi-channel inter-BS communication system. The multi-channel inter-BS communication system includes a plurality of co-existing WRAN cells. Each co-existing WRAN cell includes a plurality of data frames, and at the end of each of the plurality of data frames is a slotted CW. The slotted CW includes a hosting slot for transmitting a hosting message and two discussion slots for transmitting and receiving data. The hosting message is in a first hosting slot position in a first data frame, and the hosting message is in a second hosting slot position in a second subsequent data frame. The second hosting slot position is incremented from the first hosting slot position by a modulo factor to the second hosting slot position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the invention, examples of which are illustrated in the accompanying drawings.

Figure 1:
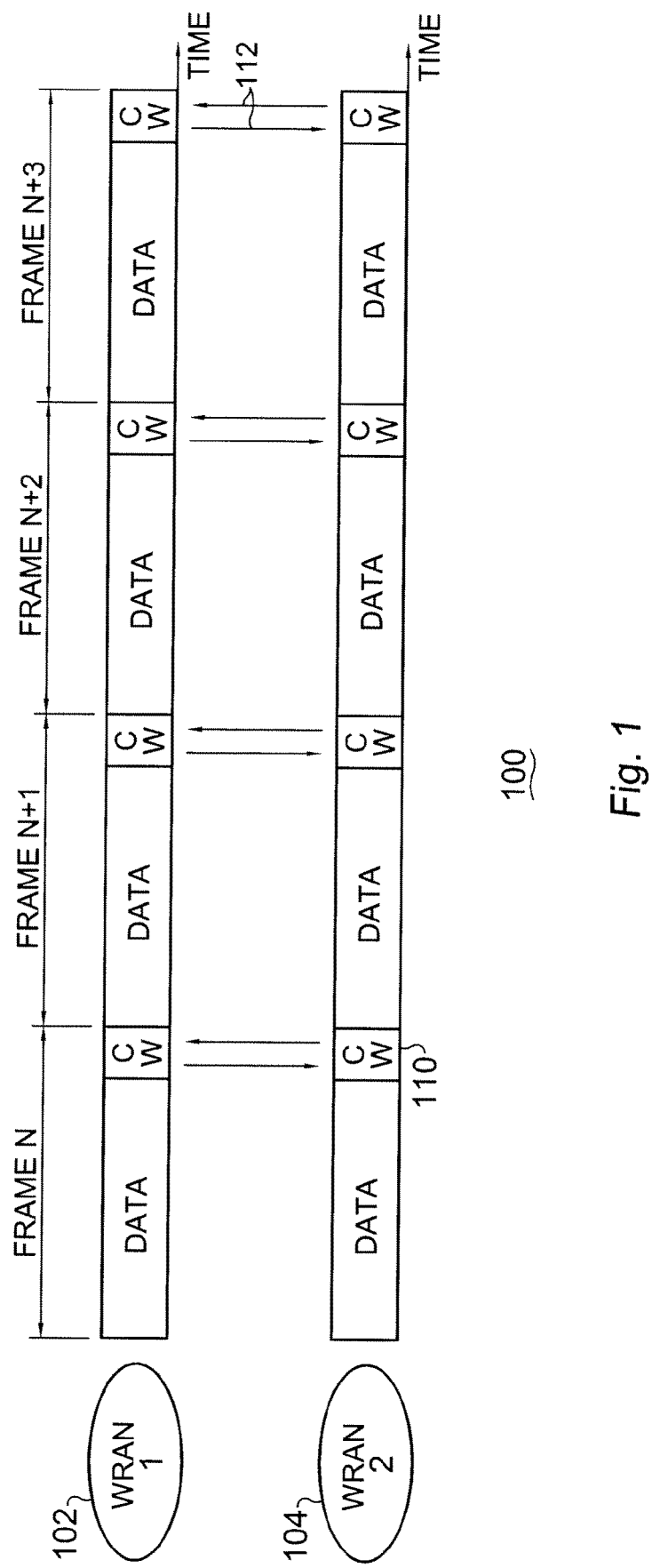
FIG. 1 illustrates a related art communication between BSs of multiple neighboring WRAN cells that are operating the same channel.
Figure 2:
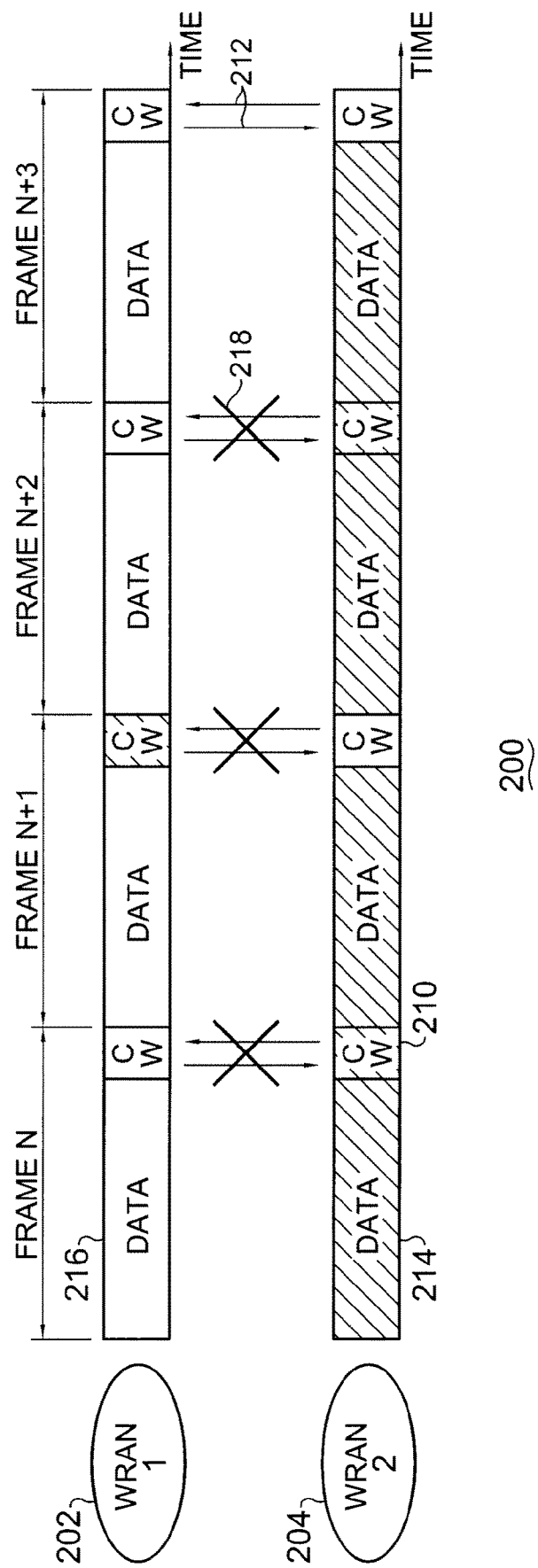
FIG. 2 illustrates a related art communication between BSs of multiple neighboring WRAN cells that are operating on different channels.
Figure 3:
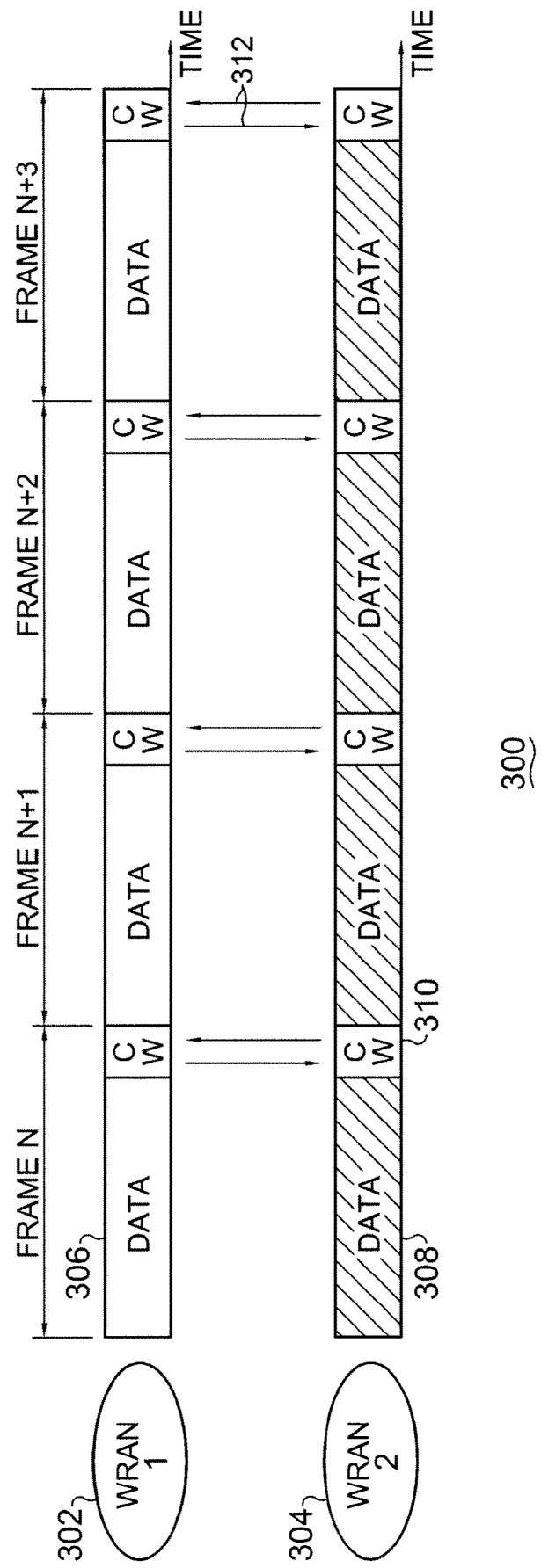
FIG. 3 illustrates a multi-channel inter-BS communication having a conference channel according to an embodiment of the invention.

FIG. 3 illustrates multi-channel inter-BS communication having a conference channel according to an embodiment of the invention. Referring to FIG. 3, the system is illustrated generally as reference number 300. The system 300 includes a WRAN1 302 and a WRAN2 304 operating on different channels as indicated by the hatching and non-hatching patterns. There are multiple frames n to n+3 in which data from WRAN1 302 and data from WRAN2 304 can be transmitted.

In this embodiment, a CW 310 is set to a conference channel, which is a common communication channel selected by the neighboring WRAN cells enabling the WRAN cells to exchange co-existence information efficiently. To ensure efficient inter-cell communication, the neighboring WRAN cells communicate with one another using the conference channel on the CW 310. Any single channel can be selected to be the conference channel. There are multiple selection techniques for selecting the conference channel; these techniques are known to one of ordinary skill in the art.

In this embodiment, there is inter-cell communication between multiple WRAN cells that are on different channels. This is accomplished by each WRAN cell selecting the same channel, depicted as non-cross hatching pattern 306, as the conference channel. The cross-hatching pattern indicates another channel 308. The channel 306 is shared by the neighboring cells, WRAN1 302 and WRAN2 304, and a conference channel, as indicated in frame n+3, for efficiently exchanged CB 312 packet transmission during CWs 310. In this embodiment, one of the WRAN cells (WRAN1 302 or WRAN2 304) is operating on the selected conference channel for data transmission and behaves as host. The other WRAN cell operating on another channel tunes to the conference channel (joining the conference) and behaves as guest. As shown in this embodiment, the problem with multi-channel inter-cell communication when the WRAN cells are on different channels or when the transmitting and receiving of the WRAN cells are not coordinated can be eliminated. This leads to enhanced efficiency of co-existence communications among multiple neighboring WRAN cells that operate on different channels.

Figure 4:
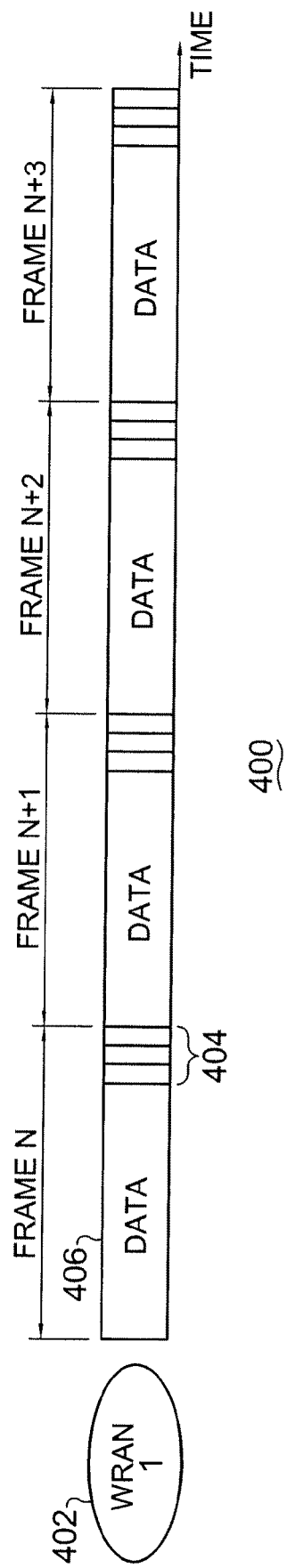
FIG. 4 illustrates a multi-channel inter-BS communication having slotted CWs according to another embodiment of the invention.

FIG. 4 illustrates a multi-channel inter-BS communication having slotted CWs according to another embodiment of the invention. Referring to FIG. 4, the communication system is generally illustrated as reference number 400. The system 400 includes a WRAN1 402 and a slotted CW 404. There are multiple frames n to n+3 in which data can be transmitted.

The slotted CW 402 is slotted so that each slot is one orthogonal frequency-division multiple access (OFDMA) symbol as known to one of skill in the art. A typical size of a slotted CW window 404 is 3 slots, e.g., 3 symbols as known to one of ordinary skill in the art, The are a number of advantages of CW slotting, which include management as transmission now begins on an edge of a slot rather than anywhere in the CW. A similar conference channel as described herein may be used in this embodiment to enhance efficiency.

Figure 5:
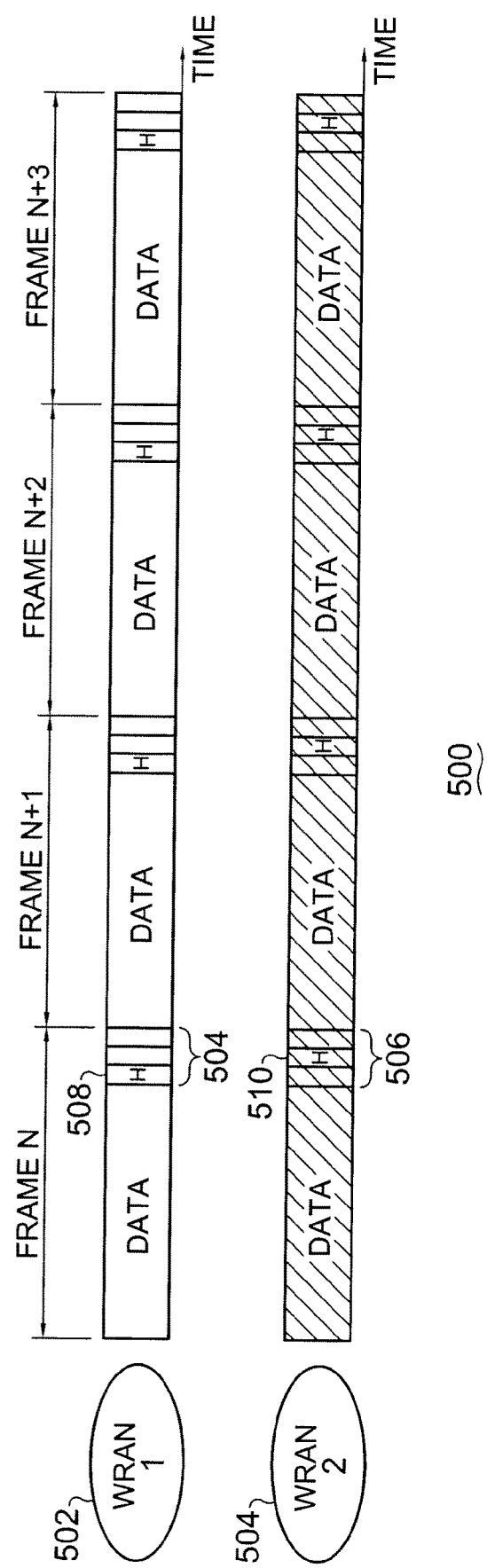
FIG. 5 illustrates a multi-channel inter-BS communication having slotted conference channels according to the embodiment of FIG. 4.

FIG. 5 illustrates a multi-channel inter-BS communication having slotted conference channels according to the embodiment of FIG. 4. Specifically, FIG. 5 illustrates a multi-channel inter-BS communication having slotted CWs including periodic channel hosting scheduled on a known hosting slot position to the other WRAN cells. In this embodiment, channel hosting is used to facilitate channel discovery and management.

In this embodiment, the system is generally depicted as reference number 500. The system 500 includes a WRAN1 502 and a WRAN2 504 operating on different channels as indicated by the non-hatching patterns and hatching patterns, respectively. WRAN1 502 includes a slotted CW 504 at the end of each data frame n to n+3. WRAN2 504 includes a slotted CW 506 at the end of each data frame n to n+3. In WRAN1 502, the CW 504 includes a CB packet (H) in a hosting slot 508. The CB packet (H) includes scheduling information including co-existence information in addition to channel hosting information. The WRAN cell transmitting the hosting beacon is called the hosting WRAN cell. The transmission of the hosting beacon is referred to as channel hosting.

A predetermined slot is used on each channel for transmitting the CB packet (H). On WRAN2 504 the hosting slot 510 of the CW 506 is used. The location of the hosting slot 508 and hosting slot 510 is configured to be known to all WRAN cells and is also configured to be in different slots for different channels in order to avoid collision of the CB packet (H). In embodiments as described herein, the position of the hosting slot can be determined by modulo scheduling. The periodicity of a hosting slot can also be adjusted as desired; for example, it can be adjusted on a one-frame basis or on a multiple-frame basis. When the periodicity is adjusted every 16 frames, it is referred to as a super-frame.

Figure 6:
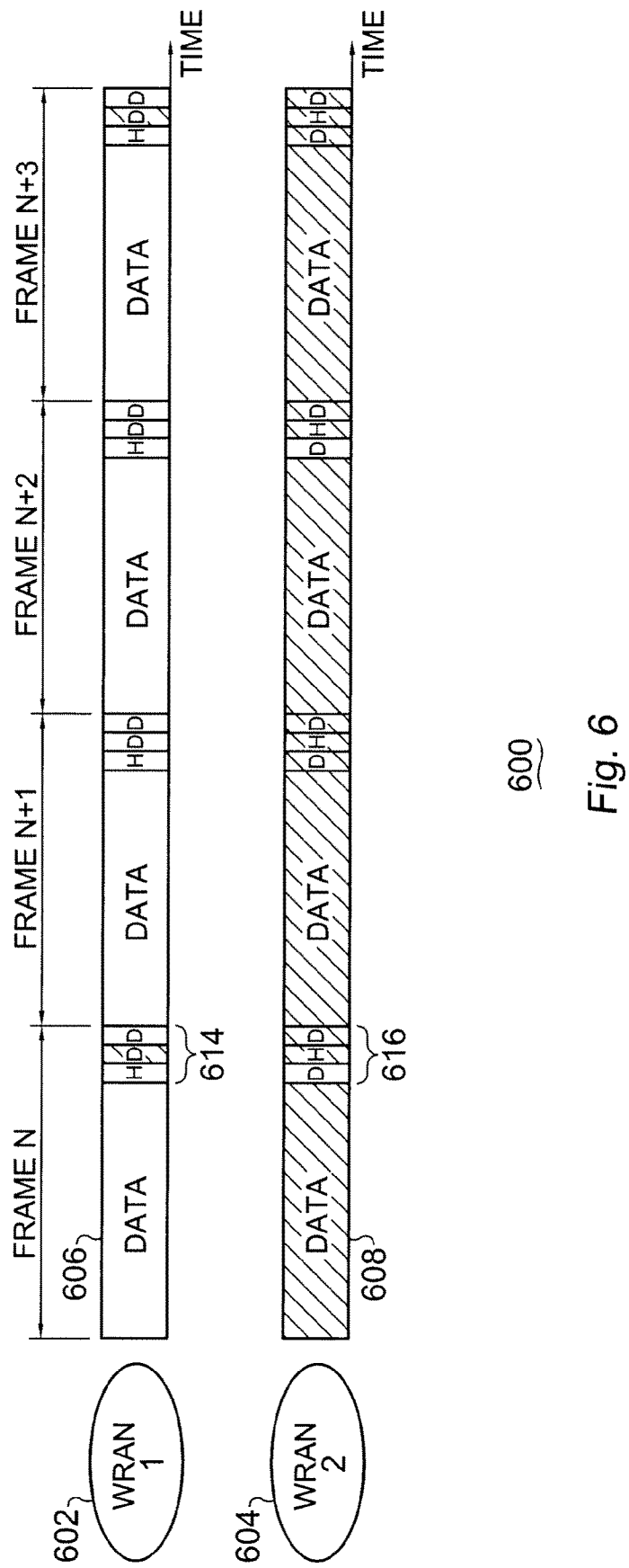
FIG. 6 illustrates a multi-channel inter-BS communication having slotted anchor CWs including periodic channel hosting according to another embodiment of the invention.

FIG. 6 illustrates a multi-channel inter-BS communication having a slotted anchor CW including periodic channel hosting according to another embodiment of the invention. Referring to FIG. 6, the system is illustrated generally as reference number 600. The system 600 includes a WRAN1 602 and a WRAN2 604 operating on different channels as identified by a first channel 606 with a non-hatching pattern and a second channel 608 with a hatching pattern. There are multiple frames n to n+3 in which data from WRAN1 602 can be transmitted and data from WRAN2 604 can be transmitted.

An anchor CW 614 is scheduled at the end of every frame of WRAN1 602 and an anchor CW 616 is scheduled at the end of every frame of WRAN2 604. The anchor CWs are on the occupying channel in order to enable efficient and backward compatible channel discovery as well as other management tasks, e.g., such as CB based ranging and geo-location support.

In this embodiment, the size of an anchor CW 614, 616 is 3 slots and includes, e.g., 3 OFDMA symbols; however, other slot sizes greater or smaller may also be utilized in aspects of the invention. There are two types of CW slots in the anchor CWs 614, 616. The two types of slots include a hosting slot (H) and a discussion slot (D). In each anchor CW 614, 616 there is at most one hosting slot (H) and at least two discussion slots (D) in a 3 slot window size. The hosting slot (H) may be used for host beacon transmission, also known as a hosting message, and also may be scheduled periodically within the anchor CWs 614, 616 in known slot positions. The host beacon (H) can carry regular co-existence information in addition to channel hosting information.

The discussion slot (D) is a contention window, which may be accessed with CSMA protocols as known in the art. The discussion slot can also be used for contention-based inter-cell communication and regular WRAN system maintenance including CB based ranging and other uses. It is noted that a group of continuous discussion slots can also be used as a contention window of larger size. Similar to the non-slotted CW, a WRAN during discussion slot(s) (D) can either stay on its own operating channel or tune to another channel occupied by a neighboring WRAN cell.

Figure 7:
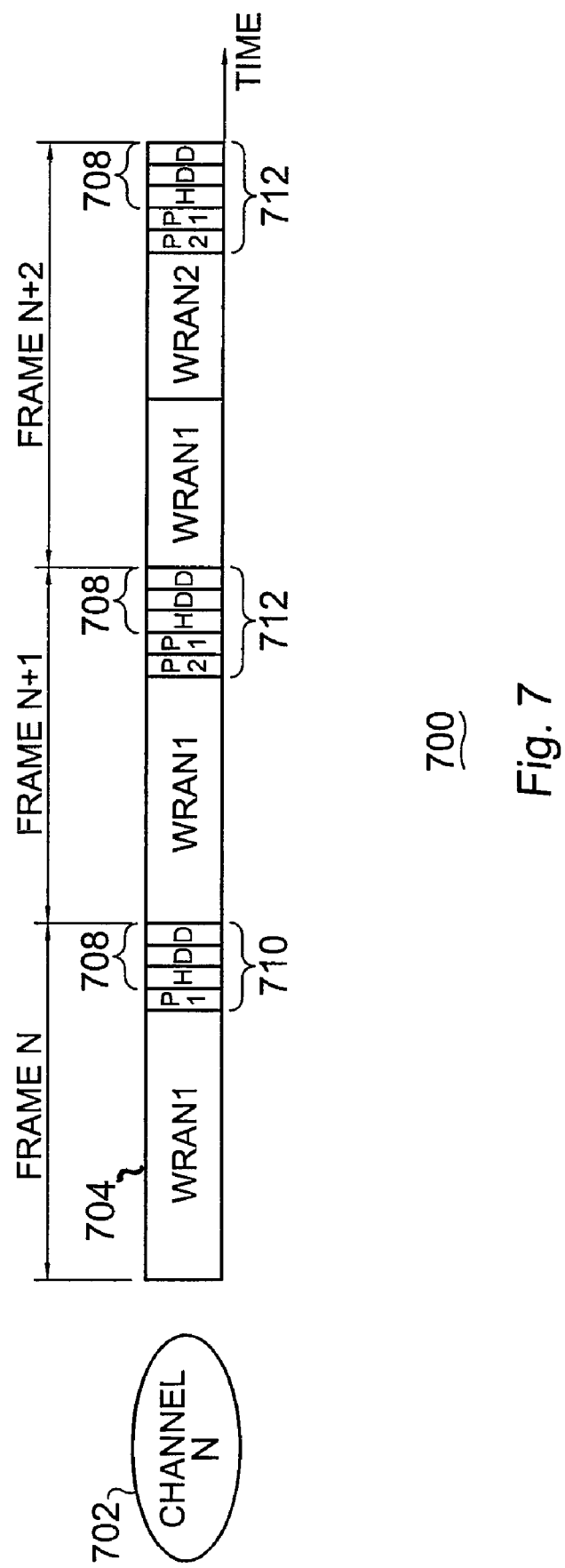
FIG. 7 illustrates co-channel inter-BS communication having slotted anchor CWs including a breathing CW according to another embodiment of the invention.

FIG. 7 illustrates a co-channel inter-BS communication having slotted anchor CWs including a breathing CW according to another embodiment of the invention. Referring to FIG. 7, a system is generally depicted as reference number 700 and includes a first channel 702 and multiple frames n to n+2. A WRAN1 and WRAN2 are on channel N 702. An anchor CW 708 as discussed herein with a minimum size (3 slots) is scheduled at the end of every data frame. The anchor CW 708 includes a hosting slot (H) and two discussion slots (D). The size of the anchor CW 708 can increase or decrease by one or more slots relative to the minimum size of the anchor CW 708. The increasing or decreasing of the anchor CW 708 is done according to the communication demand of a CB transmission. This window size adaptation is denoted as CW breathing, and a breathing CW 710 may be shared by WRAN1 704 and WRAN2 706 operating on channel 702. Also, the anchor CW 708 can be dynamically increased or decreased according to the communication demand. Accordingly, the anchor CW 708 is also referred to as the breathing CW 710.

In this embodiment, the breathing CW 710 is scheduled on the conference channel to facilitate efficient inter-cell communication among multiple WRAN cells that are operating on different channels. For example, a host WRAN on the selected conference channel may be typically responsible for scheduling the breathing CW 710 on the conference channel. The breathing (growing and shrinking) of the CW 708 may be performed on a slot basis, that is, the window size may be increased or decreased slot by slot.

In embodiments, presentation slots (P) are grown on top of the anchor CW 708. The presentation slots (P) include a CW slot reserved for CB packet transmissions for a particular WRAN cell. Each WRAN cell can reserve its own presentation slot (P) and may use the presentation slot (P) for inter-cell communications. This WRAN cell can use the conference channel or another channel as the operating channel for data transmission. Of course, other WRAN cells can tune to the conference channel to receive CB packets being transmitted by a WRAN during its reserved presentation slots (P). By utilizing the reserved presentation slots on the conference channel, efficient and collision-free inter-cell communication can be achieved.

In this embodiment, a WRAN1 704 reserves one time slot, a presentation slot (P1), that is immediately preceding the anchor CW 708. P1 is used for WRAN1 to transmit its CB packets. The allocation of the P1 slot is announced to the neighboring WRAN cells via the CB hosting packet transmitted in the hosting slot. The scheduling information can be obtained by decoding the hosting message. Accordingly, WRAN2 can tune to the P1 time slot to receive CB packets in the P1 time slot from WRAN1. Therefore, the communication of CB packets in the P1 time slot is collision free because the time slot is reserved and known from the CB hosting packet transmitted, thereby increasing efficiency of the system.

Similarly, as shown in FIG. 7, a neighboring WRAN cell, WRAN2, can reserve another presentation slot, P2, that is immediately preceding presentation slot P1 after communicating with WRAN1 sufficiently (through slot P1, and slots H, D, and D in the anchor CW 708). The anchor CW 708 grows from the basic anchor CW 708 to a larger breathing CW 712, now including presentation slots P1 and P2. FIG. 7 also shows how WRAN1 and WRAN2 can share the spectrum on Channel N 702 enabled by breathing CW based inter-cell communications. In addition, communication between WRAN1 and WRAN2 may also be conducted over the discussion slot (D), however, there may be collision within these discussion slots as WRAN1 and WRAN2 may be transmitting or receiving at the same time.

Figure 8:
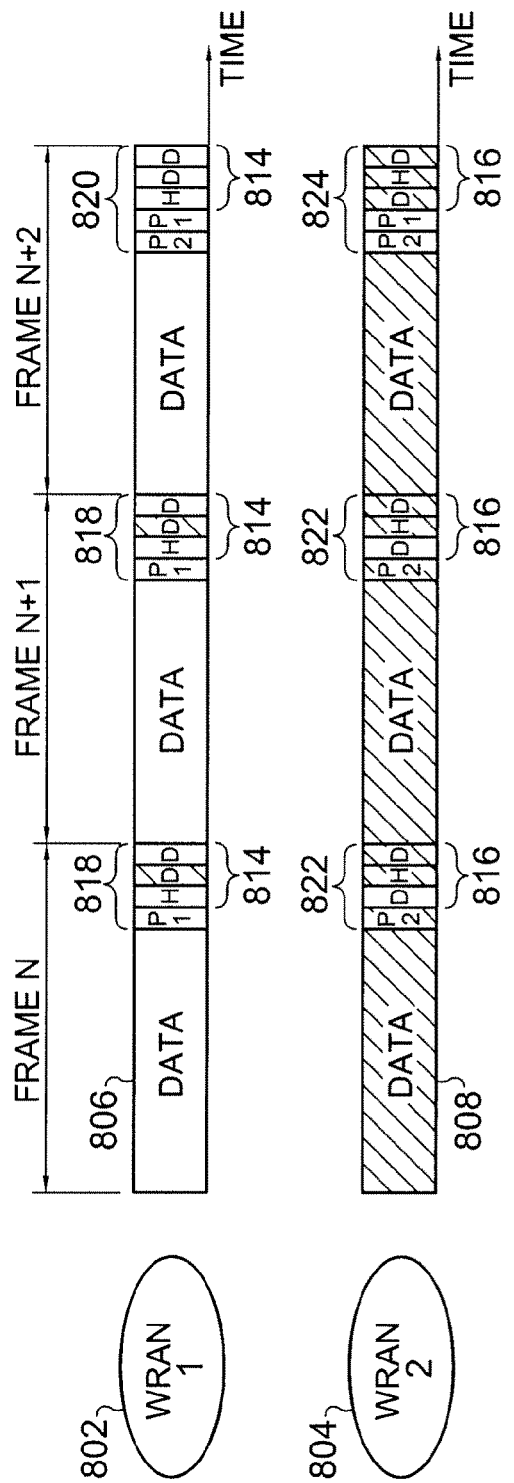
FIG. 8 illustrates a multi-channel inter-BS communication having slotted anchor CWs including a breathing CW according to another embodiment of the invention.

FIG. 8 illustrates a multi-channel inter-BS communication having slotted anchor CWs including a breathing CW according to another embodiment of the invention. Referring to FIG. 8, the system is illustrated generally as reference number 800.

The system 800 includes a WRAN1 802 and a WRAN2 804 operating on different channels as identified by a first channel 806 including non-hatching patterns and a second channel 808 including hatching patterns. There are multiple frames n to n+2 in which data from WRAN1 802 and data from WRAN2 804 can be transmitted.

Starting from frame n, WRAN1 802 and WRAN2 804 are operating on channel 806 and channel 808, respectively. An anchor CW 814 on channel 806 of WRAN1 802 is scheduled at the end of each frame. The anchor CW 814 is the minimum size and includes one hosting slot (H) and two discussion slots (D). In addition, an anchor CW 816 on channel 808 of WRAN2 804 is also scheduled at the end of each frame. The anchor CW 816 includes one hosting slot (H) and two discussion slots (D).

As discussed herein, WRAN1 802 and WRAN2 804 behave as the hosts on channels 806 and 808, respectively, by transmitting host beacons (H) in the host slots. The host beacon (H) can carry regular co-existence information in addition to channel hosting information.

In addition, WRAN1 802 reserves a presentation slot (P1) in a breathing CW 818 of a first size in frames n and n+1. The presentation slot (P1) precedes the anchor CW 814 on channel 806 by utilizing a breathing CW 818. In addition, WRAN1 802 can tune to the presentation slot (P2) of WRAN2 804 in data frame n+2 by utilizing a breathing CW 820 of a second size. The presentation slot (P2) precedes the presentation slot (P1) of the anchor CW 814 in frame n+2. Similarly, in data frame n and n+1, WRAN2 804 reserves a presentation slot (P2) on channel 808 by utilizing a breathing CW 822 of a first size. In addition, WRAN2 804 increases the breathing CW 822 by one slot to breathing CW 824 to include an additional presentation slot (P1) between the presentation slot (P2) and the discussion slot (D). Specifically, in data frame n+2 WRAN2 804 adds a presentation slot (P1) by tuning to presentation slot (P1) on channel 806.

In operation, at frame n, WRAN1 802 and WRAN2 804 exchange CB packets through the anchor CWs 816, 814 on both channels utilizing the hosting slots including a hosting beacon (H) and discussion slots (D) to transfer the desired CB packets. Specifically, WRAN2 804 may receive the hosting message from WRAN1 802 by tuning to channel 806 as shown in frame n. In addition, WRAN1 802 may receive the hosting message from WRAN2 804 in frame n+2 by tuning to channel 808. However, in frame n and n+1 the presentation slots are scheduled at the same time; therefore, the presentation packets can not be received in frames n and n+1. This may be resolved in the n+2 frame; WRAN1 802 will be transmitting on the presentation slot (P1) while WRAN2 804 will be transmitting on the presentation slot (P2), and WRAN1 802 can receive the packet transmitted during presentation slot (P2) packet as it is on the same channel. That is, by utilizing the breathing CWs 820, 824, coordination may be accomplished. Communications between WRAN1 802 and WRAN2 804 from now can be performed using presentation slot (P2) on channel 808 as the conference channel or the presentation slot (P1) on channel 806. In addition, in frame n+1, WRAN1 802 and WRAN2 804 continue to exchange CB packets through the anchor CW on both channels utilizing the hosting slots (H) and discussion slots (D).

In embodiments of the invention, there is also reservation life-time of the presentation slot. That is, to prevent a WRAN cell from holding a presentation slot for too long of a time, a reservation life-time of the presentation slot may be established. The reservation life-time of the presentation slot of a WRAN on the conference channel will be set to expire at the end of a reservation life-time. Typically the reservation life-time expires at the end of 16 frames (a super-frame). After the reservation life-time is expired, the presentation slot of a WRAN is recycled (by the host) and the size of the breathing CW, including the presentation slot, is reduced by the number of presentation slots expired. It is noted, however, the reservation life-time may be set to any number of frames of 1 or greater.

Figure 9:
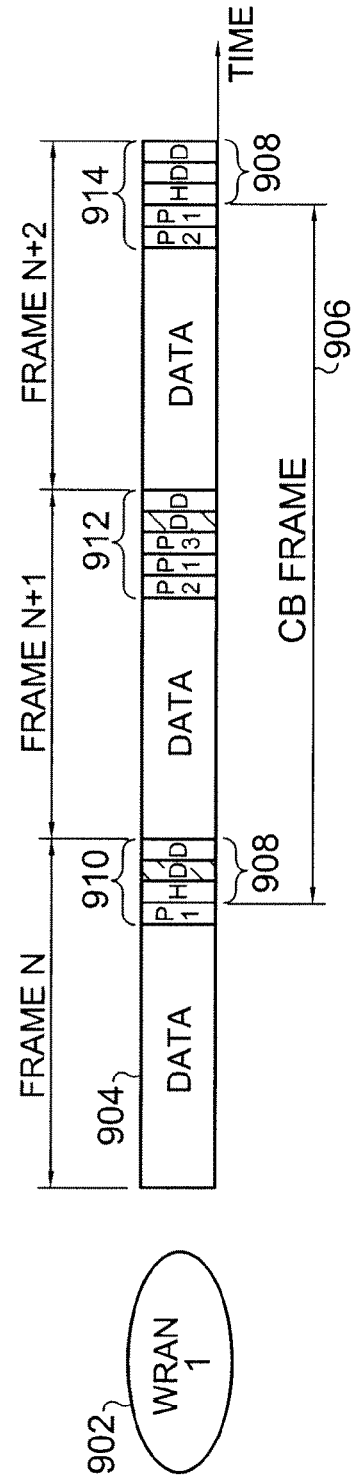
FIG. 9 illustrates a CB framing on two consecutive data frames according to another embodiment of the invention.

FIG. 9 illustrates a CB framing on two consecutive data frames according to another embodiment of the invention. Referring to FIG. 9, a system is generally depicted as reference number 900. The system includes a WRAN1 902 on a channel 904. An anchor CW 908 is positioned at the end of each frame. A first breathing CW 910 includes a presentation slot (P1). A second breathing CW 912 includes a first presentation slot (P1), a second presentation slot (P2) and a third presentation slot (P3). A third breathing CW 914 includes a first presentation slot (P1) and a second presentation slot (P2). In this embodiment, a CB frame 906 is also utilized.

The CB frame 906 provides a scalable mechanism for multi-channel CBP based inter-cell communication. The CB frame 906 includes a group of CWs in a number of consecutive regular data frames and is defined with a host beacon (H) in a hosting slot. The CB frame 906 is a logical frame, without any implication to (requiring no modification on) the physical layer.

As the CB frame 906 is defined with a hosting slot, there is only one hosting slot in the CB frame 906. That is, the CB frame 906 starts with a hosting slot and ends before the next preceding hosting slot, not including the next preceding hosting slot is indicated in FIG. 9. In this embodiment, the CB frame 906 includes the slots, H, D, D, P2, P1, P3, D, D, P2, and P1. The CB frame does not include data in frame n+1 or n+2.

The slots in the anchor CW 908 within one CB frame 906 are called the anchor CW of the CB frame 906. Similar to a regular data frame, a CB frame 906 includes a map and the payload. The map of a CB frame 906 is contained in the hosting beacon and specifies the payload in the frame. The payload is the number and type of CW slots scheduled by the map of the CB frame 906. The CB framing can be performed on the conference channel and the regular channels.

It is noted that the hosting beacon is generated and transmitted by the host WRAN cell of a channel. It would cause a problem if the host WRAN of the conference channel has to switch channels. This situation may be addressed as follows: if the host WRAN of a conference channel has to switch its operating channel, the CB frame scheduling on the current channel is updated by remaining on the same conference channel, by replacing the conference host or by choosing a new channel to be the conference channel. This new conference channel can be either the channel to which the current host switches or the channel currently hosted by one of the conference guests. The utilization of a CB frame enables the indication of multiple slots to enable efficient communication. That is, the H slot will include scheduling information and subsequent CW slots. Therefore, neighbor WRAN cells may have information of upcoming slots in order to tune to those slots, if desired. By way of example, a neighboring WRAN cell will know that in frame n+2 presentation slot P2 and presentation slot P1 will have transmissions. Accordingly, a neighboring WRAN cell could tune to presentation slot P2 of WRAN2 and/or presentation slot (P1) of WRAN1, if desired. Thereby, efficiency of the overall system is increased by knowing the scheduling information for a large number of slots.

Figure 10:
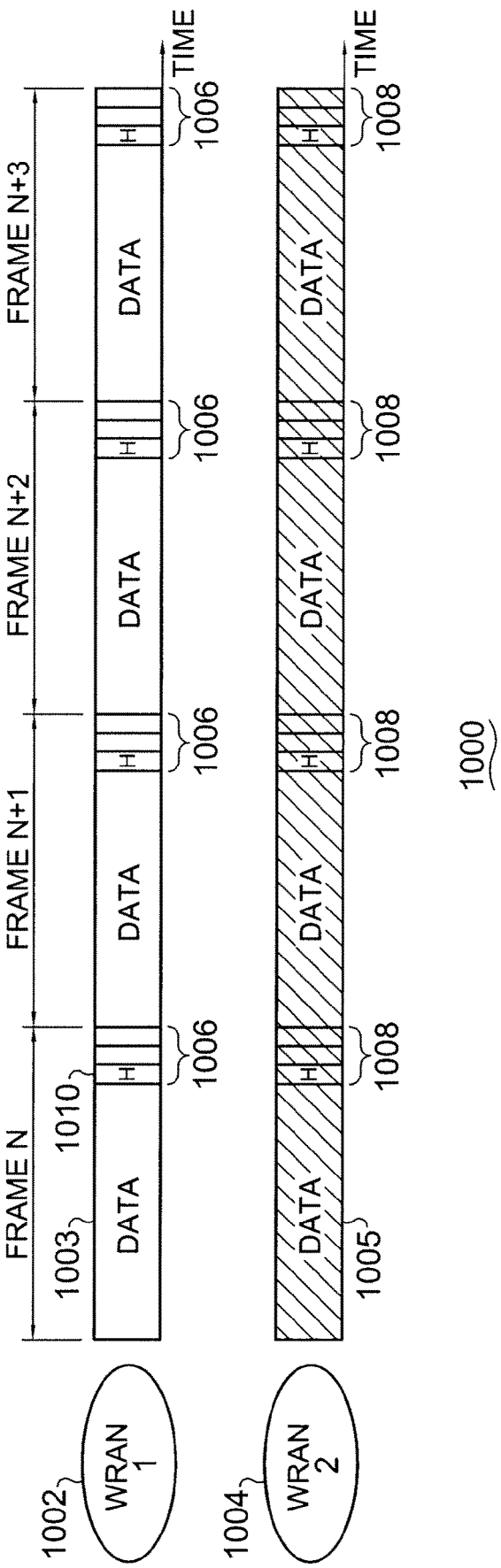
FIG. 10 illustrates multi-channel inter-BS communication having fixed-slot scheduling according to another embodiment of the invention.

FIG. 10 illustrates multi-channel inter-BS communication having fixed-slot scheduling according to another embodiment of the invention. Referring to FIG. 10, a system is generally depicted as reference number 1000. The system includes a WRAN1 1002 on a first channel 1003 indicated by a non-hatching pattern and a WRAN2 1004 on a second channel 1005 indicated by a cross-hatching pattern. WRAN1 1002 includes data frames n to n+3 and WRAN2 1004 includes data frames n to n+3. WRAN1 1002 includes an anchor CW 1006 and WRAN2 1004 includes an anchor CW 1008 at the end of each data frame.

In embodiments of the invention, scheduling of channel hosting packets (H) is an issue to be resolved in order to enable effective inter-cell communication among multiple WRAN cells that are operating on different channels. Channel hosting can be used to facilitate channel discovery and management for neighbor WRAN cells. Hosting packets (H) are periodically transmitted in hosting slots in an anchor CW on an operating channel by a WRAN cell occupying the channel. In this embodiment, hosting packets 1010 are transmitted in a known slot of CW 1006 of WRAN1 1002. As the hosting packets 1010 are transmitted in a known slot, they can be received easily by neighboring cells so that WRAN operation on the hosting channel can be easily discovered. Moreover, the hosting packet may contain CB frame management information, e.g., map and payload information.

In this embodiment, channel host scheduling is conducted to schedule all hosting packets (H) from each WRAN cell operating on different channels to be transmitted in a fixed slot within an anchor CW as shown in FIG. 10. More specifically, in WRAN1 1002 and WRAN2 1004, the channel hosting packet (H) is provided in the first anchor CW 1006 slot of WRAN1 1002 and in the first anchor CW 1008 slot of WRAN2 1004. This is referred to as fixed-slot scheduling. Fixed-slot scheduling provides a known and repeatable slot for transmitting the channel hosting packet (H).

There are some limitations with fixed-slot scheduling that may affect its feasibility and performance. For example, in order for the host packet (H) transmitted at the same time slot among neighboring WRAN cells to be received without conflict, at least two pairs of CB links between any two neighboring cells should be available.

Figure 11:
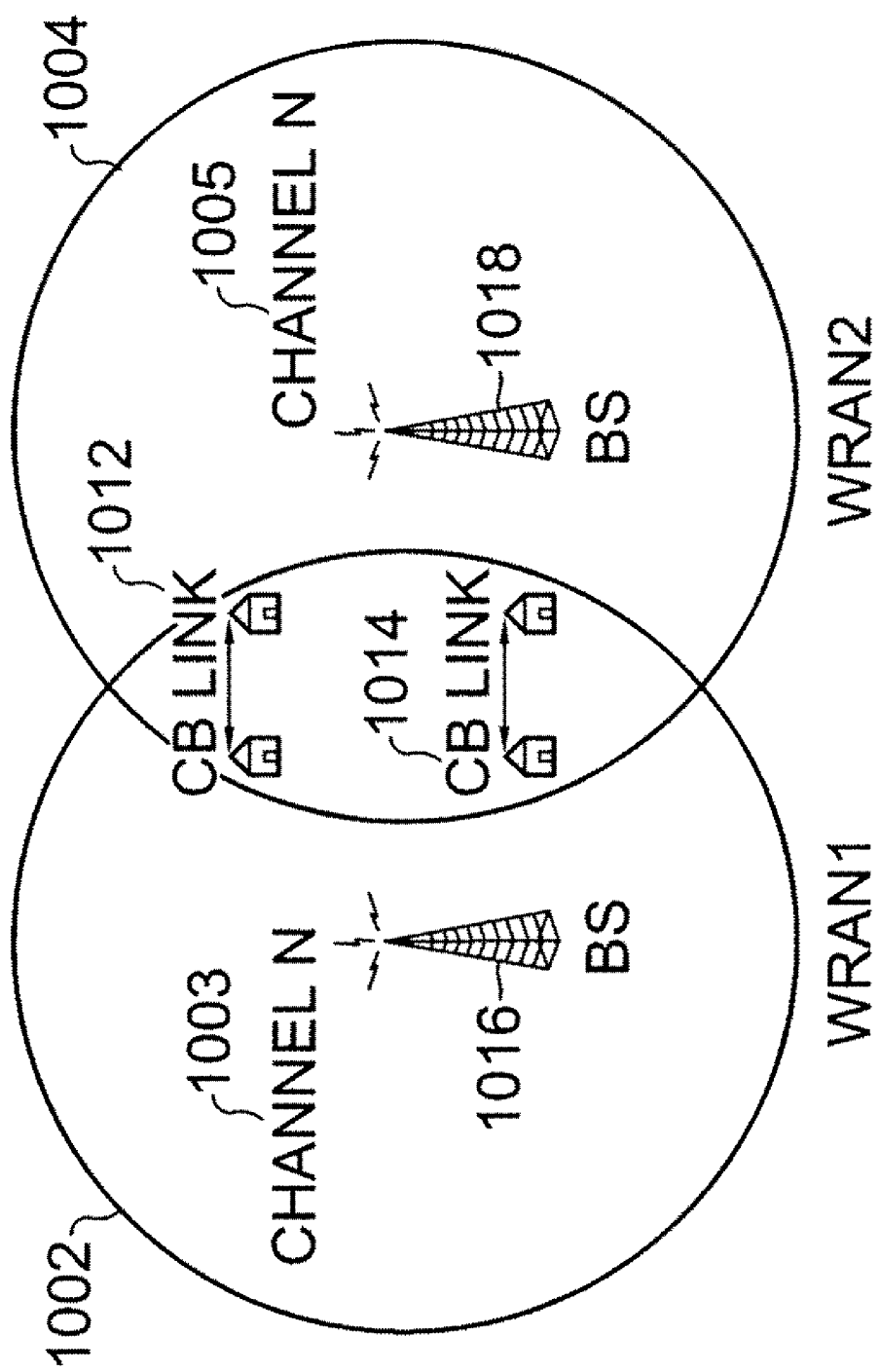
FIG. 11 illustrates CB links between neighboring cells according to another embodiment of the invention.

More specifically, referring now to FIG. 11, CB links between neighboring cells according to another embodiment of the invention are illustrated. As shown WRAN1 1002 on channel 1003 includes CB link 1012 and WRAN2 1004 on channel 1005 includes CB link 1014. WRAN1 1002 includes BS 1016 and WRAN2 1004 includes BS 1018. In this embodiment, CB link 1012 can be used for channel hosting by WRAN1 1002 and CB link 1014 can be used for channel hosting by WRAN2 1004. CB link 1012 includes a CPE from WRAN1 1002 and a CPE from WRAN2 1004. The CB link 1012 is a wireless link as known in the art for transmitting or receiving information on a desired channel. CB link 1014 includes a CPE from WRAN1 1002 and a CPE from WRAN2 1004. The CB link 1014 is a wireless link as known in the art on a desired channel.

In operation, CB link 1012 may be used for transmitting a hosting message including a hosting packet (H) from WRAN1 1002 to neighboring cells, and CB link 1014 may also be used for transmitting a hosting message including a hosting packet (H) to neighboring cells. Accordingly, if WRAN1 1002 wishes to receive a hosting message including a hosting packet (H) from WRAN2 1004, a link is required to receive the message when fixed-slot scheduling is utilized.

CB link 1014 includes a CPE from WRAN1 and a CPE from WRAN2. That is, one link can be used for transmitting while one link can be used for receiving. Moreover, in this embodiment, there may have to be enough frequency separation between the two channels on which hosting packets (H) are exchanged in order to avoid interference as known to one of ordinary skill in the art.

Figure 12:
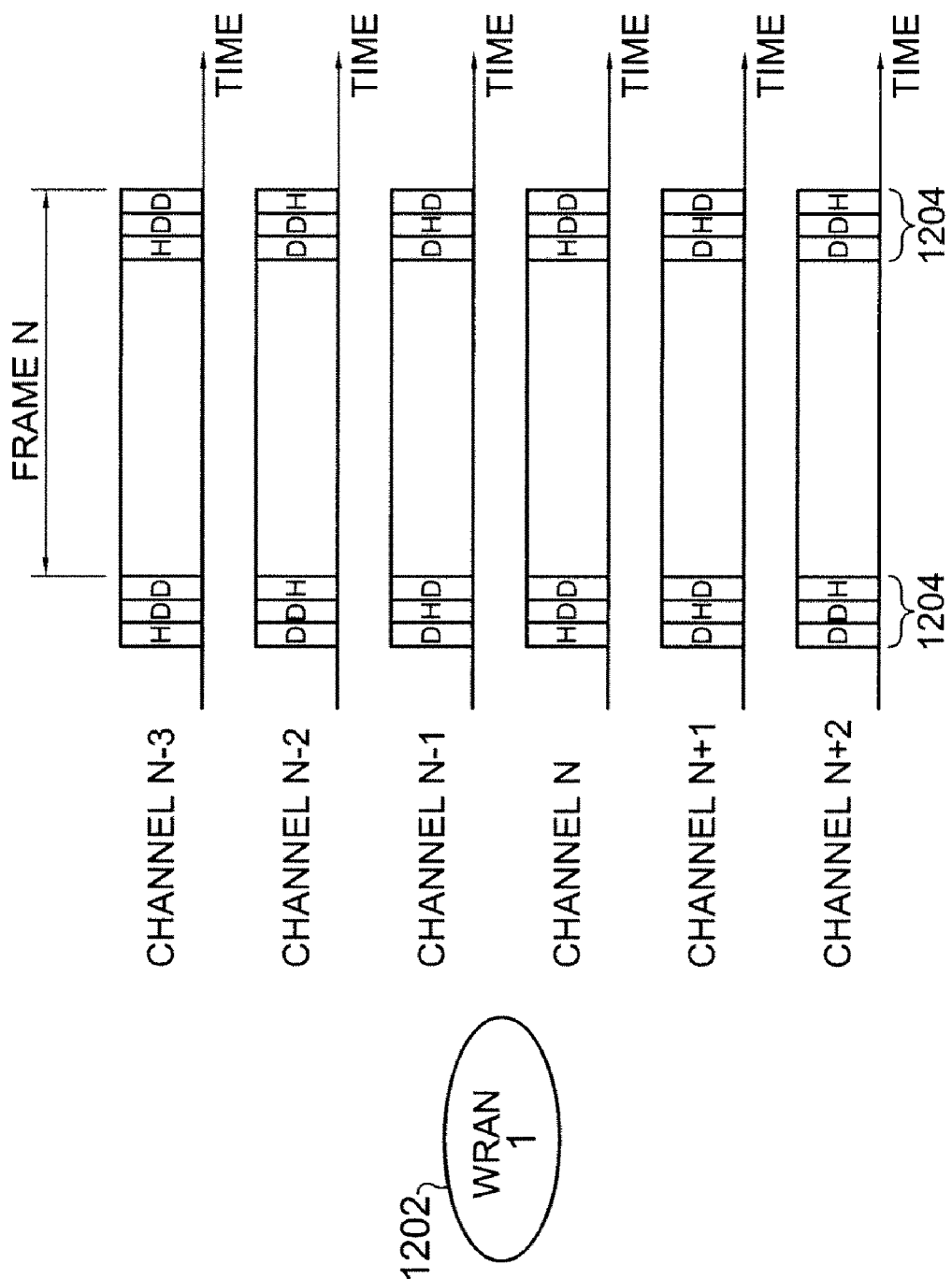
FIG. 12 illustrates multi-channel inter-BS communication having modulo scheduling according to another embodiment of the invention.

FIG. 12 illustrates multi-channel inter-BS communication having modulo scheduling according to another embodiment of the invention. In this embodiment, modulo scheduling of a channel hosting message provides conflict-free transmission of host packet (H) without the limitation imposed by fixed-slot scheduling. In order to provide conflict-free transmission of host signaling, a coordinator, coordinating a hosting WRAN cell, is desired.

In modulo scheduling a repeatable number of slot spacing is used between each host message (H) on different channels of WRAN cells. That is, the modulo factor is the number of slots between a repeated host message (H). When utilizing this technique, for the modulo factor of n where n is the possible slots for being scheduled, host signaling on the two channels can be detected without conflict. The channel hosting is scheduled in one of the anchor CW slots to be detected by other neighboring WRAN cells.

Referring to FIG. 12, the system is generally depicted as reference number 1200. The system includes five consecutive channels (channel N−2 to N+2) and WRAN1 1202 on channel N. In this embodiment, the modulo factor (n) equals the total number of anchor CW slots in one frame. Accordingly, the modulo factor is 3 as there are three slots in an anchor CW 1204 as shown in FIG. 12.

Therefore, WRAN1 hosting on channel N can reliably capture the channel hosting packets (H) without conflict on channels (N+−2). Moreover, this modulo scheduling is conflict-free scheduling and does not require CB links. In addition, if paired with available CB links, channels beyond channel N+−(n−1) can be detected by the channel hosting beacons transmitted on those channels, given N+−(n−1) provides sufficient frequency separation to avoid interference.

Using this technique, the channel hosting message (H) is scheduled in one of the anchor CW slots and is detectable by other neighboring WRAN cells. Therefore, the modulo factor n equals the total number of anchor slots in one CB frame.

A very large number of channels can be detected for a given large value of n. For example, channel N+−47 (47×2 channels) can be detected if there are 48 anchor CW slots (in one super-frame) available in one CB frame. Therefore, CB framing as described can contain the following number of frames: 1, 2, 4, 8 and 16 and the total numbers of anchor CW slots, which is the modulo factor 3, 6, 12, 24 and 48, respectively.

Figure 13:
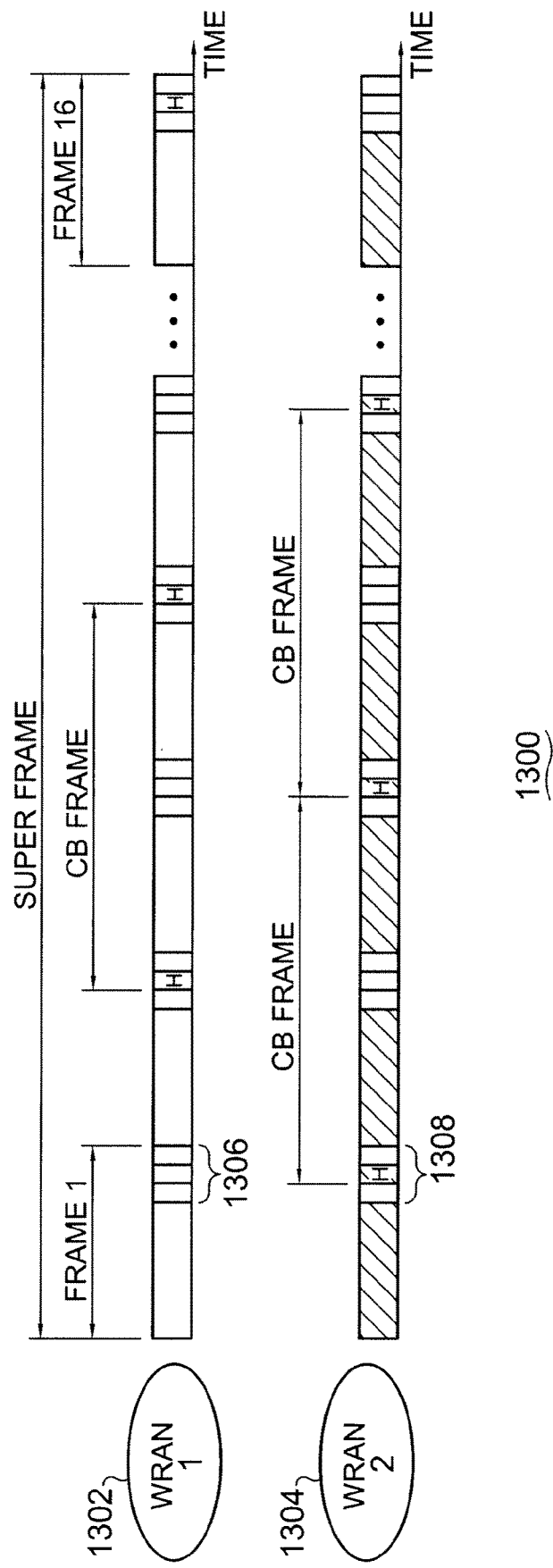
FIG. 13 illustrates multi-channel inter-BS communication having modulo scheduling according to another embodiment of the invention.

FIG. 13 illustrates multi-channel inter-BS communication having modulo scheduling according to another embodiment of the invention. Referring to FIG. 13, a WRAN1 1302 and WRAN2 1304 are shown. The modulation factor is 6, which is the number equal to the total number of anchor slots in one CB frame. As shown, on WRAN1 1302 the channel is 5 and so the hosting message (H) starts on the fifth anchor CW slot and is repeated with a modulation factor of 6. On WRAN2 1304 the channel is 2 and so the hosting message (H) starts on the second anchor CW slot and is repeated with a modulation of 6.

In addition, the synchronized super-frame boundary is used as the counting reference point. The first data frame after the super-frame boundary is frame 1. The next frame is frame 2, and so on. For a hosting message (H) slot position(s), the slot position(s) has a starting point of the channel number and is incremented with the modulation factor. By way of further illustration, when the CB frame size is equal to 1 data frame, the location can be determined by counting slots from the first CW slot of every data frame. In the case of the CB frame size equaling 2 data frames, the location can be determined by counting slots from the first CW slot of frame 1, frame 3, frame 6, frame 9, frame 12 and frame 14. In the case of the CB frame size equaling 4 data frames, the location can be determined by counting slots from the first CW slot of frame 1, frame 5, frame 9 and frame 13. In the case of the CB frame size equaling 8 data frames, the location can be determined by counting slots form the first slot for frame 1 and frame 9. Finally, in the case of the CB frame size equaling 16 data frames, the location can be determined by counting slots from the first CW slot of frame 1 only.

In addition, in embodiments of the invention, the last few frames in a super-frame can be used as a quiet period. Or, in another case, the whole super-frame could be quiet. Accordingly, if the hosting message (H) is not captured for a well-known slot that may have appeared in a quiet period, a WRAN cell may retry in subsequent cycles. The re-trying may be conducted up to a maximum number of re-trying steps.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A multi-channel inter-base station (BS) communication system, comprising:
    a plurality of wireless communication networks with overlapping service areas; and
    a plurality of wireless communication channels that can be used by the wireless communication networks;
    wherein each wireless communication network comprises a BS and a plurality of consumer premise equipment (CPE) transceivers;
    wherein communication both within and between the wireless communication networks uses synchronized frames;
    wherein one of the wireless communication channels is selected as a conference channel on which the base stations exchange information, including coexistence information; and
    wherein at the end of each frame is a slotted co-existence window comprising a hosting slot known to other wireless communication networks.

2. The system of claim 1, wherein the slotted co-existence window includes three slots.

3. The system of claim 2, wherein the three slots comprise a hosting slot for transmitting a hosting message and two discussion slots for transmitting and receiving data.

4. The system of claim 3, wherein the slotted co-existence window is capable of dynamically increasing by one or more slots or dynamically decreasing by one or more slots.

5. The system of claim 4, wherein the slotted co-existence window includes four slots and one slot is a presentation slot reserved for communication from one of the plurality of wireless communication networks.

6. The system of claim 1, further comprising a co-existence beacon (CB) frame comprising a plurality of co-existence window slots over at least two frames and starting at a hosting message and ending at the next subsequent hosting message, wherein the hosting message comprises mapping and payload information for the CB frame.

7. The system of claim 1, wherein the slotted co-existence window comprises a hosting slot for transmitting a hosting message and two discussion slots for transmitting and receiving data from the plurality of wireless communication networks, and
    wherein the hosting slot position is in the same slot position in each of the plurality of data frames.

8. The system of claim 1, wherein the slotted co-existence window comprises a hosting slot for transmitting a hosting message and two discussion slots for transmitting and receiving data from the plurality of wireless communication networks, and
    wherein the hosting message is in a first hosting slot position in a first data frame and the hosting message is in a second hosting slot position in a second subsequent data frame and the second hosting slot position is incremented from the first hosting slot position by a modulo factor to the second hosting slot position.

9. A method of communicating among a plurality of wireless communication networks, each comprising a base station (BS) and a plurality of consumer premise equipment (CPE) transceivers, having overlapping service areas and a plurality of wireless communication channels available for use, the method comprising:
    using synchronized frames to communicate both within and between wireless communication networks;
    selecting and using one of the wireless communication channels as a conference channel on which the base stations exchange information, including coexistence information; and
    including a slotted coexistence window at the end of each frame, wherein the slotted coexistence window comprises a hosting slot known to the other wireless communication networks.

10. The method of claim 9, wherein the slotted co-existence window comprises three slots including a hosting slot for transmitting a hosting message and two discussion slots for transmitting and receiving data.

11. The method of claim 9, wherein the slotted co-existence window is capable of dynamically increasing by one or more slots or dynamically decreasing by one or more slots.

12. The method of claim 11, wherein the slotted co-existence window includes four slots and one slot is a presentation slot reserved for communication from one of the plurality WRAN cells.

13. The method of claim 9, further comprising allocating a plurality of co-existence window slots over at least two frames as a co-existence beacon (CB) frame and comprising a hosting message that includes mapping and payload information for the CB frame.

14. The method of claim 9, wherein the slotted co-existence window comprises a hosting slot for transmitting a hosting message and two discussion slots for transmitting and receiving data, and
    wherein the hosting slot position is in the same slot position in each of the plurality of data frames.

15. The method claim 9, wherein the slotted co-existence window comprises a hosting message and two discussion slots for transmitting and receiving data from the plurality of wireless communication networks, and
    wherein the hosting message is in a first hosting slot position in a first data frame and the hosting message is in a second hosting slot position in a second subsequent data frame and the second hosting slot position is incremented from the first hosting slot position by a modulo factor to the second hosting slot position.

16. A multi-channel inter-base station (BS) communication system, comprising:
    a plurality of wireless communication networks with overlapping service areas; and
    a plurality of wireless communication channels that can be used by the wireless communication networks;

wherein each wireless communication network comprises a BS and a plurality of consumer premise equipment (CPE) transceivers;

wherein communication both within and between the wireless communication networks uses synchronized frames;

wherein one of the wireless communication channels is selected as a conference channel on which the base stations exchange information, including coexistence information; and wherein at the end of each frame is a slotted co-existence window, wherein the slotted co-existence window comprises a hosting slot for transmitting a hosting message and two discussion slots for transmitting and receiving data, and wherein the hosting message is in a first hosting slot position in a first data frame and the hosting message is in a second hosting slot position in a second subsequent data frame and the second hosting slot position is incremented from the first hosting slot position by a modulo factor to the second hosting slot position.

17. The system of claim 16, further comprising a co-existence beacon (CB) frame comprising a plurality of co-existence window slots over at least two frames and including a hosting message, wherein the hosting message includes mapping and payload information for the CB frame.

18. The system of claim 17, wherein the CB frame is a super-frame.

* * * * *